9483X
E. Thomas,
Fracture Apparatus,
Patented Mar. 8, 1836.
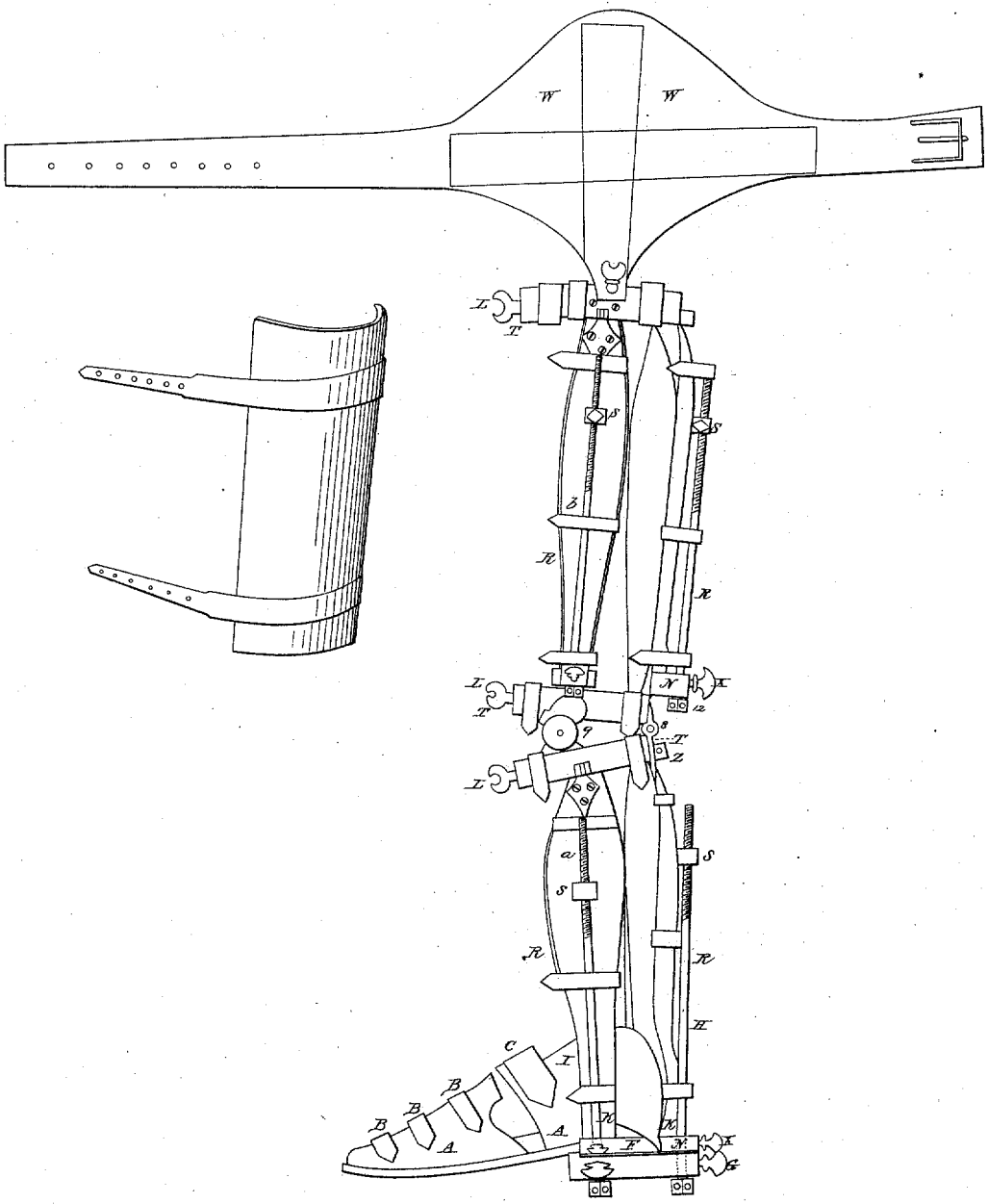
AM. PHOTO-LITHO. CO. N.Y. (OSBORNE'S PROCESS.)

9483X

Mar 8, 1836

1

Enoch Thomas Athens Ohio

Letters Patent.

The Schedule referred to in these Letters Patent and making part of the same
containing a description in the words of the said Enoch Thomas himself of
his improvement in the Metallic Sliding Splint for reducing fractures & dislocation To all whom it may concern Be it known that I Enoch Thomas of the Town of Athens in the County of
[illegible] and State of Ohio have invented a new and useful improvement in
the Splint for reducing fractures and dislocations of limbs in the human frame
called "Thomas' Metallic Sliding Splint" Which is described as follows refer-
ence being had to the annexed drawings of the same making part of this specification
This Splint is adapted to the leg of any man of height from five feet 4 inches
to seven feet. also to any sized leg natural or diseased. The reduction of the fracture
or dislocation being accomplished by the use and power of Springs. In order
to show more clearly the principle of this splint reference must be had to the annexed
drawings. It may be said to consist of four parts. 1 The Shoe AA. 2. The part
below the knee [illegible] 3. The part above the knee [illegible] And 4 the [illegible]
W. The parts are connected by screws and hinges. The Shoe is connected with the part
below the knee by the screws RR which [illegible] through the [illegible] and slide in the
heel of the shoe. Two lateral and one posterior to the shoulder screw S. in each splint
In the lower end of the splint RR there is a Slide 4 1/2 inches long in at the lower
of which is a shoulder N thro which the screws RR pass. The [illegible] screw X pass
ing thro the shoulder to a groove in the screw Rod R by which the rod is kept
in its place. This can also be effected by screwing a nut on the rod close to the
shoulder N so that by turning the same it will act on the splint at B. Like
wise by turning the screw R the splint below the knee can be lengthened or short-
ened 4 or more inches by which a fracture below the knee may be reduced
with perfect ease. The steel band T below the knee to which the splints are
attached by means of the hinges [illegible] is the point of extension. In dressing [illegible]
by any one of the screws may be taken out while the other two remain in full
force so that the leg can be dressed at once. The foot is retained fast in the
shoe by the Strap L which passes over the instep from a staple near the [illegible]
[illegible] part of the heel on one side to a staple and buckle on the other side 9483x Mar 8, 1836 to another strap C from the quarter with a buckle & likewise by the cramp with strap
and buckles B B B. The part below the knee is connected to the part above the knee
[illegible] hinge (fig 8.) and the ankle splint fig 9 which gives flexion to the splint
these connect the steel bands T T. on the band above the knee and shoulders fig
12. which answer to the shoulders of the slides in the splint. then which as well
as ~~thin~~ the shoulders of the slides, the screw R of the thigh runs to the shoulder screw
S. thro which it passes as in the splint below the knee. The slides in these splint
are the same as ~~those~~ below. viz 4 1/2 inches which together give to the splint
9 inches more than its natural length. The lapel screws X are the same as in
the lower splints which also would be fixed by a nut on the rod R. instead
of the screws X. secured on to the rod close to and above the shoulder N. One
end of the steel bands T T T. passes through a mortise in the other [illegible] inches
so that the bands can be enlarged or diminished when required. These bands
in the application of the splint are to be laid open. when the leg is in the
the bands are fastened by the lapel screws L L L. so that any leg natural
or diseased may be accommodated, and by the slides and lapel screws in the [illegible]
or the whole splint may be enlarged from top to ~~the~~ bottom. In the application
of this splint the shoe is first put on and secured; then the bands are opened and
the leg laid in and ~~secured~~ by the lapel screws. then the splints are brought on
and the screws below the knee put in are fixed to their places by the lapel screws
belonging to them or by a nut secured on the rod above the shoulder N. Then
by acting on the screws the leg is extended. The screws about the knee act in the
same manner. The illium piece is then put on and the straps buckled around
the lower part of the abdomen, and they may be enlarged at pleasure. All
and fast on with buckle. The strap of the Illium piece is padded.
the splints as well as the bands and illium piece are padded. For a fur-
ther illustration of my invention I refer to the model of the same deposited
in the Patent Office. What I claim as my invention and which I
desire to secure by letters patent is the combination ~~arrangement~~ and
adaptation of the several parts of the splint as before described. for the re
duction of fractures and dislocations of limbs

[illegible] Enoch Thomas

Witnesses
Wm P Elliott
Ithiel Town

[illegible]